350-3.6 SR
XR 3,551,594
SEARCH ROOM 2

United State

[11] 3,551,594

SUBSTITUTE FOR MISSING XR

[72] Inventors Louis H. Enloe
Colts Neck;
William C. Jakes, Jr., Rumson; Charles B. Rubinstein, Colts Neck, N.J.

[21] Appl. No. 779,843
[22] Filed Nov. 29, 1968
[45] Patented Dec. 29, 1970
[73] Assignee Bell Telephone Laboratories, Incorporated
Murray Hill, Berkeley Heights, N.J.
a corporation of New York
Continuation-in-part of application Ser. No. 635,124, May 1, 1967, now abandoned.

[54] REAL TIME HOLOGRAPHIC TELEVISION SYSTEM

7 Claims, 3 Drawing Figs.

[52] U.S. Cl. .......... 178/6.5, 178/6.6, 178/7.5, 350/3.5
[51] Int. Cl. .......... H04n 5/82, H04n 9/56, H04n 9/58
[50] Field of Search .......... 350/3.5; 178/6.5, 7.2, 7.55, 67.5TV

[56] References Cited

UNITED STATES PATENTS

| | | | |
|---|---|---|---|
| 2,227,002 | 12/1940 | Schlesinger | 178/7.55 |
| 2,227,401 | 12/1940 | Schlesinger | 178/7.2 |
| 2,244,794 | 6/1941 | Neidhardt | 178/69.5TV |
| 3,158,683 | 11/1964 | Waggener | 178/7.2 |
| 3,444,316 | 5/1969 | Gerritsen | 178/6.5 |

OTHER REFERENCES

Leith, Upatnieks, Hildebrand & Haines-Requirements for a Wavefront Reconstruction Television System-Oct. 1965 Vol. 74, No. 10 Jour. of SMPTE-Pgs. 893-896

Preston-Kreuzer-Ultrasonic Imaging Using a Synthetic Holographic Technique-Applied Physics Letters-Mar. 1967 Vol. 10-No. 5-Pgs. 150-152

*Primary Examiner*—Robert L. Griffin
*Assistant Examiner*—Joseph A. Orsino, Jr.
*Attorneys*—R. J. Guenther and E. W. Adams, Jr.

ABSTRACT: This disclosure relates to a television system that utilizes holographic techniques to provide a real time, three-dimensional image at the receiving end of the system, with the image changing in perspective as the object and/or observer moves. The object is illuminated using coherent light. The light reflected from the object impinges on the photosensitive surface of a photomultiplier plate or equivalent while a narrow reference beam of coherent light scans, in a raster type manner, the photosensitive surface to thereby generate a signal which is modulated in phase and amplitude in accordance with the hologram pattern related to the object reflected light. The signals carrying the hologram information, and interspersed sync pulses, are then transmitted to a remote receiver. At the receiving end, the holographic signals are impinged on a video display surface by an electron beam using conventional television techniques. After each frame of the latter signals are so impinged, a coherent light source is pulsed with the light therefrom directed toward the written frame of holographic information. In this manner, an instantaneous image of the original object is obtained at the receiver. The described operation is continuously carried out a frame at a time.

INVENTORS L. H. ENLOE
W. C. JAKES, JR.
C. B. RUBINSTEIN
BY John K. Mullarney
ATTORNEY

REAL TIME HOLOGRAPHIC TELEVISION SYSTEM

CROSS REFERENCE TO RELATED APPLICATION

This application is a continuation-in-part of our copending application, Ser. No. 635,124, filed May 1, 1967, now abandoned.

BACKGROUND OF THE INVENTION

This invention relates to television systems and, more particularly, to a television system utilizing wave front reconstruction techniques (i.e., holography) to achieve a real time, three-dimensional display at a remote receiver location.

Television systems for reproducing at a remote receiver location an image of the object or scene viewed by a "camera" tube at the transmitter location are, of course, well-known and in wide usage today. However, the receiver image is only two-dimensional.

The wave front reconstruction process or holography, apparently first proposed by Dennis Gabor of the Imperial College of Science and Technology in London, has been used successfully to produce three-dimensional photographic pictures that have a surprising realism. As is explained, for example, in the article by Leith and Upatnicks entitled "Photography by Laser," Scientific American Volume 212, No. 6, page 24, June 1965, a hologram is a photographic recording of light wave patterns which are formed by the interference of a reference light beam with light reflected from an object. A hologram differs from a conventional photographic transparency in that light wave patterns representing an image, rather than the image itself, are recorded on the photographic medium. When the hologram is then illuminated by coherent light, an image of the original object is projected from the hologram which is visually perceivable, in three dimensions, as the object itself. It is well-known that a two-dimensional holographic television camera can theoretically be obtained by the simple expedient of interfering the object and reference beams directly on a conventional television camera tube. However, the spatial resolution requirements on the photo sensitive surface of the camera tube is so severe that this method is impractical.

It is the purpose of the present invention to utilize the essential principles of holography in a television system to provide a real time, three-dimensional image of the object or scene at the receiving end of the system in a manner which circumvents the aforementioned high spatial resolution requirements.

SUMMARY OF THE INVENTION

It is accordingly the primary object of the present invention to achieve a real time, three-dimensional television display system.

It is a further object of the invention to produce at the transmitting end of a television system a signal which is modulated in phase and amplitude in accordance with the hologram pattern that is related to the object, or scene, reflected light by scanning a coherent reference beam with respect to said object, or scene, reflected light.

These and other objects are attained in accordance with the present invention wherein coherent light from a source such as a laser is reflected from an object or scene against a photodetection plate or array. Simultaneously, a reference light beam is also directed against said photodetection plate or array. The reference beam is of relatively small dimension and it is caused to scan, in a raster type manner, with respect to the light pattern reflected from the object or scene. The photodetection plate or array (e.g., a photomultiplier) thereby generates an alternating current signal, as a result of said scan, which is modulated in phase and amplitude in accordance with the interference pattern produced by the interfering light beams impinging on the photodetector.

A second photodetection means is located adjacent the aforementioned photodetection plate or array and in conjunction with the reference beam that is scanned thereover it serves to generate the necessary horizontal and vertical sync pulses which are interspersed in the signal derived from the aforementioned photodetection plate or array.

The signals carrying the holographic information and interspersed sync pulses are then transmitted to one or more remote receivers. At a receiving end, the holographic information signals are heterodyned to a lower carrier frequency, if necessary, which is a multiple of the line scanning frequency and are directed by an electron gun so as to impinge, in a raster type manner, onto a video display surface (e.g., thermoplastic tape), using conventional television techniques. After each successive frame of the holographic signals has been written on said display surface as described, a coherent light source is pulsed with the light therefrom directed toward the written frame of holographic information. An instantaneous image of the original object or scene is thus obtained at the receiver. The described operation is carried out a frame at a time and thereby presents to an observer a real time, three-dimensional image of the original object or scene.

DETAILED DESCRIPTION

Figures 1, 1A:
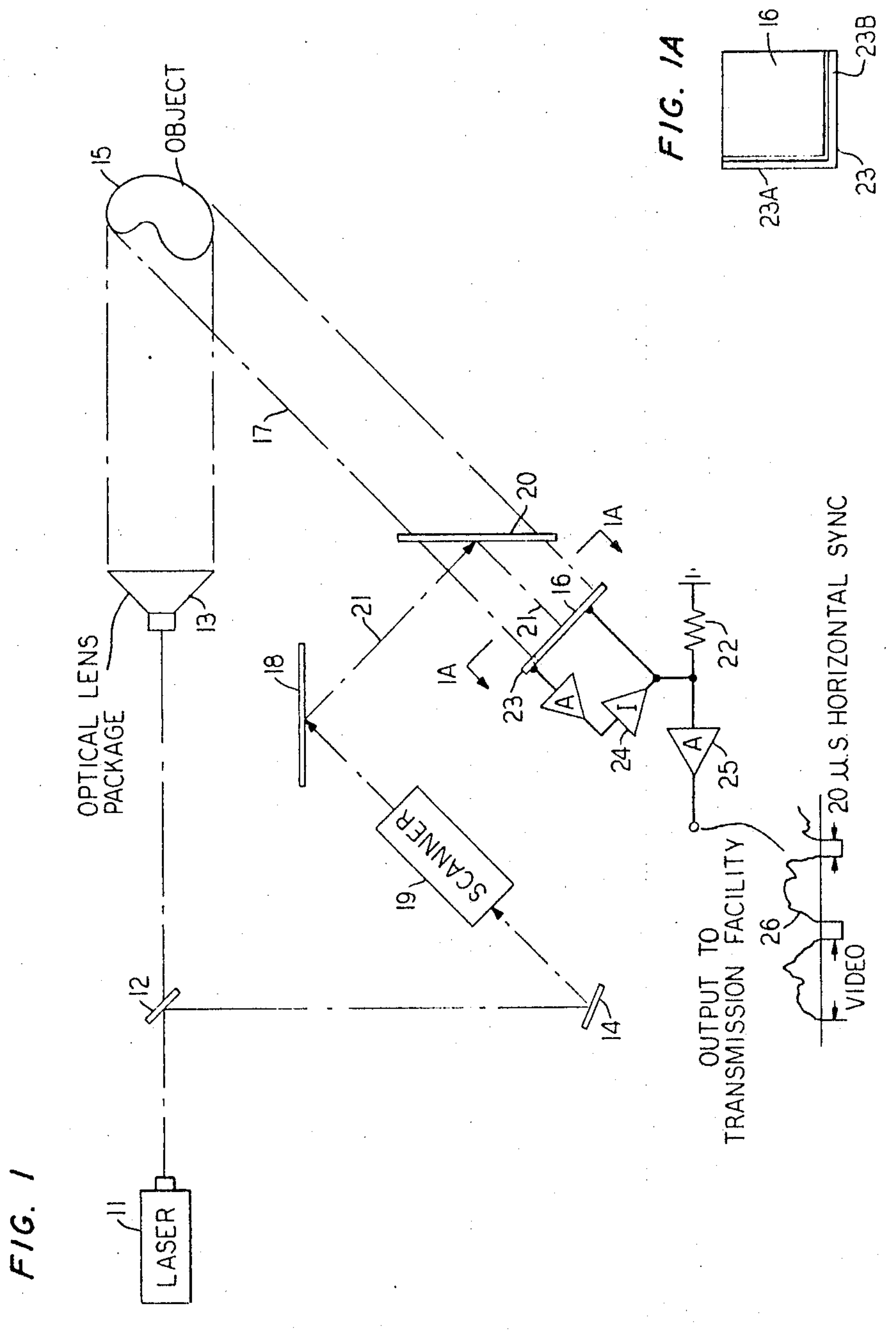
FIG. 1 illustrates a simplified schematic diagram of a transmitting terminal of a television system in accordance with the present invention.
FIG. 1A is a view of the photodetector arrangement as viewed from the line 1A–1A of FIG. 1.

Referring now to the drawings, FIG. 1 shows in simplified schematic form, the transmitting apparatus for generating a composite transmitting signal comprising the holographic information related to an object or scene and the requisite horizontal and vertical synchronization pulses. The apparatus comprises a source of monochromatic coherent light 11 such as a laser, a partially reflecting mirror 12 and an optical lens package 13. The mirror 12 is designed to transmit therethrough approximately half of the impinging coherent light, while reflecting the other approximate half to mirror 14. Since the light beam from the laser is dimensionally small (e.g., a diameter of approximately 2 millimeters) a series of lenses (i.e., lens package 13) is utilized to insure that the entire object or scene 15 is illuminated by the coherent light from source 11. When the coherent light is reflected from object 15, part of it impinges on the photodetection plate or array 16, as shown by the light beam path 17. The schematically illustrated photodetector 16 may comprise the plate of a conventional photomultiplier tube, an array (520 × 520) of photodetector diodes or any other device known in the art which takes impinging light rays and converts the same to electrical signal current, or voltage.

Simultaneously, the part of the coherent light reflected by mirror 12 and mirror 14 is delivered to the mirror 18 via the scanner 19. The light reflected by mirror 18 is, once again, reflected by the beam splitter 20 and it then impinges on the photodetection plate or array 16, as shown by the light beam path 21. The light reflected from mirror 18 and beam splitter 20 maintains its coherency and substantially its same general characteristics. On the other hand, light reflected from the irregular object 15 is diffuse and has irregular wave fronts although this reflected light is nevertheless temporally coherent and monochromatic.

Disregarding for the moment the function and purpose of the scanner 19, it is well-known to those in the holography art that when two light beams such as 17 and 21 reach the plate 16, they will interfere constructively and destructively. At those locations at which the two light components add in phase, they will illuminate the plate to a greater extent than at those locations at which the two components are out of phase and are therefore mutually destructive. Now if the plate 16 were a photographic transparency, a hologram recording such as shown and described in the article by Leith and Upatnicks would be obtained. And as further explained in said article, an image of the object 15 may later be reconstructed from the hologram recording by properly illuminating the hologram with a reference beam of coherent light corresponding to the original reference beam.

The scanner 19 serves the purpose of scanning the reference beam, in a raster type manner, over the photo detection plate 16. Accordingly, the pointlike reference beam (i.e., on the order of 10 microns) is caused to scan horizontally across the width of the photodetection plate 16 and then snap back to the starting edge and begin a second horizontal scan somewhat below the first horizontal scan. This process is continuously carried out until the entire plate has been so scanned, and the process is then repeated. As the scanned beam and the object light beam interfere constructively and destructively with each other, in the same manner as described, a corresponding current will be developed across the output resistance 22, which current will comprise a carrier that is modulated in phase and amplitude in accordance with the interference or holographic pattern generated by the interfering beams of light.

To generate a suitable signal, modulated as described, the aperture defined by the waist of the reference beam must be sufficiently small so as to resolve the highest spatial frequency of the object beam. And a small waist or aperture corresponds, of course, to a large cone angle of convergence. Now if the object should appear to lie outside this cone of convergence, the aperture of the scanning beam will prove too large to resolve the highest spatial frequency of the object beam. Thus, as will be apparent, the object should preferably appear to fall or lie within the aforementioned cone of convergence. This can be most readily accomplished by the use of a conventional beam splitter 20 positioned as shown in FIG. 1 of the drawing. Looking from the photodetector surface, the object will appear to lie within the cone of convergence of the reference beam, assuming of course an adequate cone angle as described above, and yet the object in no way obscures any part of the reference beam, or vice versa. This cone of convergence has not been shown in the drawing since the same will be readily appreciated by those in the art.

The beam splitter 20, which brings the two incident beams into the desired condition of overlap, is of the conventional type, i.e., it serves to transmit or pass approximately half of the incident light while reflecting the remaining half.

The aforementioned scanning may be carried out mechanically with rotating optical mirrors or by various electro-optical arrangements known in the art. Accordingly, the invention should in no way be construed as limited to any particular known method for scanning the reference beam 21 over the photodetection plate. The simplest scanning technique is, of course, a sequential line-by-line scan; however, interlaced scanning is also feasible and the invention is in no way limited to the particular type scan utilized.

A second photodetection means 23, similar to plate 16, is located adjacent to the photodetection plate 16 for the purpose of generating the horizontal and vertical sync pulses. As shown more specifically in FIG. 1A, the photodetector 23 is L-shaped and separated from plate 16 by an air space or a thin strip of insulating material. As the reference beam 21 is horizontally swept from left to right, across the photodetection devices shown in FIG. 1A, a horizontal sync pulse is first generated as the reference beam is swept across the section 23A of the photodetection means 23. As the horizontal sweep then continues across plate 16 the aforementioned holographic information signal is generated. This occurs with each horizontal sweep. The last horizontal sweep of the reference beam is across the section 23B of photodetection means 23 and this generates the requisite, relatively wide (i.e., with respect to horizontal sync pulses), vertical sync pulses. The scanned beam then returns to the initial starting point for the next frame sweep.

The output current signals from the photodetection means 23 is amplified, inverted in inverter 24, and then delivered to the output resistance 22. The signals carrying the holographic information and interspersed sync pulses are amplified in amplifier 25 and delivered to a transmission facility such as a coaxial cable or a radio relay system. The composite output signal, minus the carrier, is partially illustrated at 26 in FIG. 1. The video is, of course, the holographic information carrying signal developed by the scan across plate 16 and the horizontal sync pulses are interspersed, as shown, and of reverse polarity.

Figure 2:
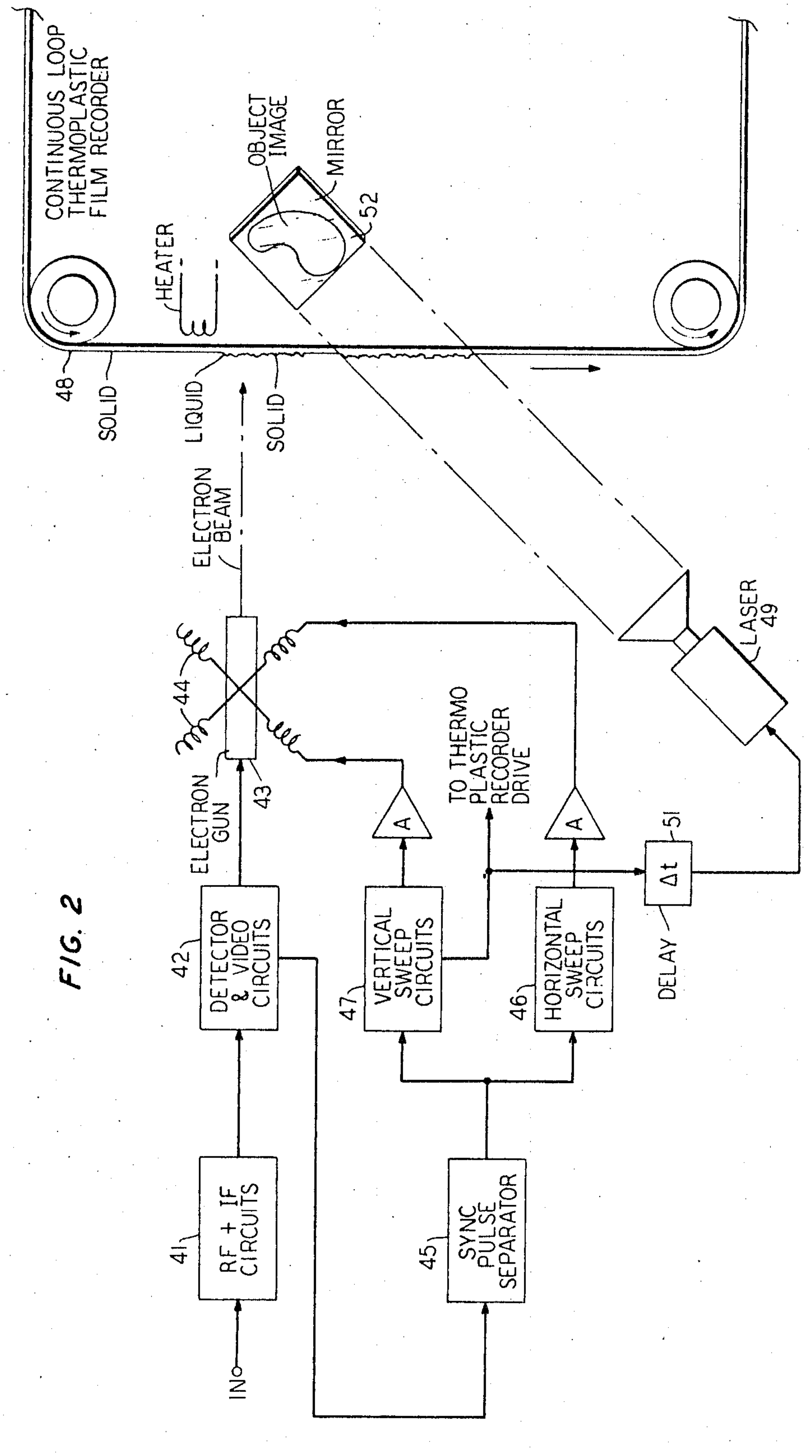
FIG. 2 illustrates a simplified schematic diagram, partly in block form, of a typical receiver of a television system in accordance with the invention.

Turning now to FIG. 2 of the drawings, a typical receiver of a television system in accordance with the invention is shown to comprise input R.F. and I.F. circuits 41, detector and video circuits 42, and electron gun and deflection coils 43 and 44, respectively, a sync pulse separator 45 which separates the horizontal and vertical sync pulses from the incoming signal and from each other (relying on their respective time durations), and horizontal and vertical deflection sweep circuits 46 and 47, respectively. The receiver might also comprise a means to heterodyne to a lower carrier frequency if necessary. The above-enumerated circuitry is conventional to television systems in general and has been extensively described in the literature; see, for example, "Television Standards and Preacice," edited by D. M. Fink, McGraw-Hill Book Co., Inc. (1943) and "Electronic and Radio Engineering" by F.E. Terman, McGraw-Hill Book Co., Inc. (1955), Fourth Edition, page 991 et seq.

The electron beam from the electron gun 43 is modulated in intensity in accordance with the received holographic information signals. The sweep signals delivered to the deflection coils 44 from the horizontal and vertical sweep circuits cause this beam to be swept in a raster type manner over the video display. thermoplastic tape 48. Thermoplastic tape has been used extensively for video display purposes and the same is thoroughly described in the literature; see, for example, the article entitled "Thermoplastic Recording Tape Systems" by Norman Kirk, Journal of the Society of Motion Picture and Television Engineers) (SMPTE), Volume 74, August 1965, pages 666—668, and the patents and publications cited therein.

After each successive frame of the holographic information has been written on the thermoplastic tape display surface, an energizing pulse signal is delivered from the vertical sweep generator 47 to the thermoplastic film recorder drive system (not shown), and to the laser source 49 via the time delay 51. Continuous loop thermoplastic film recorders are well-known in the art and therefore need not be described in detail herein; see the article entitled "Thermoplastic Recording: A Progress Report," by W. E. Glenn, Journal of the SMPTE, Volume 74, August 1965, pages 663—665. As pointed out in the above article the tape can be erased, after being used for its intended purpose, and then reused in a continuous manner. As further pointed out in the above-cited articles in the Journal of the SMPTE, movement of the tape can be continuous or intermittent. In a "continuous-motion transport" the electron beam scans the thermoplastic tape surface horizontally while the tape motion past the recording zone provides the vertical scan. Alternatively, the beam can be electronically scanned in the horizontal and vertical and after a complete frame has been so scanned the tape is moved rapidly during the fly-back period and then a new frame scan begins on the next unused section of the tape. The latter arrangement, termed "intermittent-motion transport," is illustrated in the embodiment shown in FIG. 2. However, it will be realized by those in the art that the continuous-motion transport can just as readily be used herein.

After a complete frame of holographic information has been written as described, the tape is moved rapidly, for the next electron beam writing operation, in response to a pulse signal initiated at the beginning of the vertical fly-back period. The coherent light source, laser 49, is then pulsed after a short delay with the light therefrom directed toward the just-written frame of holographic information. The short delay is for the purpose of assuring that the tape is completely stationary prior to the pulsing of the laser source 49.

When the laser is momentarily pulsed, an instantaneous image of the original object or scene is obtained and the same is projected on the mirror 52. The mirror 52 is positioned, as illustrated, so that it reflects the instantaneous image at a right angle out of the plane of the paper and toward an observer appropriately positioned.

The above-described operation is carried out at the receiver a frame at a time and thereby presents to an observer a real time, three-dimensional image of the original object or scene. The operation is carried out at a sufficiently high rate (e.g., 30 or more frames per second) to present a continuous picture to an observer.

The system described is intended to be illustrative only of a preferred embodiment of the invention. For example, the well-known "Swiss Eidophor" display system can be readily used in place of the thermoplastic tape recorder shown in FIG. 2. In this system, the video signal is used to modulate an electron beam which is being scanned over an oil film in a raster pattern. The oil film rests on a glass substrate whose opposite surface is coated with a conductive material. The electron beam deposite a charge on the oil film which is proportional to the video signal amplitude. A potential applied between the oil film and the conductive coating introduces electrostatic forces which deform the oil film in accordance with the charge pattern. Thus, recording is accomplished in this case as a thickness variation; see the article entitled "The Fisher Large-Screen Projection System (Eidophor)," by E. Baumann, Journal of the SMPTE, Volume 60, April 1953, pages 344—356.

For purposes of the invention, the laser 11 can be operated in a single predominant mode or in a dual mode ($\omega_1$, $\omega_2$) fashion. Thus the object and reference beams can be at the same predominant frequency or at separate and distinct frequencies, $\omega_1$ and $\omega_2$. In the latter case, filters should preferably be included in the respective paths to eliminate all but the desired optical frequency component. The carrier of the desired modulated output signal is dependent upon the frequencies $\omega_1$ and $\omega_2$ of the object and reference beams (assuming here a dual mode laser operation) and also upon the angle between the object and reference beams. For the aforementioned dual mode operation this angle can be reduced to zero, this results in reduced resolution requirements. When the object and reference beams are at the same optical frequency, the angle between the two beams should be somewhat greater than that minimum value required to prevent spectrum overlap between the electrical spectra corresponding to the two conjugate wave fronts.

Accordingly, it is to be understood that the above-described embodiment is merely illustrative of the principles of the present invention and that numerous modifications or alterations may be made therein without departing from the spirit and scope of the present invention.

We claim:

1. In a real time three-dimensional television system having a transmitter, one or more remote receivers, and a transmission facility for sending signals generated at the transmitter to said remote receivers, a source of coherent light located at the transmitter, means for illuminating an object scene with coherent light derived from said source, photodetection means positioned to receive a portion of the light reflected from said object scene and serving to directly convert incident light to an electrical output signal, means for also deriving a narrow reference beam of coherent light from said source, the aperture defined by the waist of the reference beam being sufficiently small so as to resolve the highest spatial frequency of the object light beam, and means for raster scanning the reference beam over said photodetection means so as to generate in response thereto an alternating current signal which is modulated in phase and amplitude in accordance with the interference pattern produced by the interfering light beams impinging on the photodetection means.

2. A system in accordance with claim 1 wherein a beam splitter is positioned in the paths of said reflected light and said reference beam so as to bring the same into a predetermined condition of overlap prior to incidence upon said photodetection means.

3. A system in accordance with claim 2 wherein a second photodetection means in positioned adjacent to, yet insulated from, the first-mentioned photodetection means, said reference beam also scanning over said second photodetection means, the scanning of said reference beam with respect to said second photodetection means serving to generate horizontal and vertical synchronization pulses which are interspersed in said alternating current signal.

4. A real time three-dimensional television system comprising a source of coherent light, means for illuminating an object scene with coherent light derived from said source, photodetection means positioned to receive a portion of the light reflected from said object scene and serving to directly convert incident light to an electrical output signal, means for also deriving a narrow reference beam of coherent light from said source, the aperture defined by the waist of the reference beam being sufficiently small so as to resolve the highest spatial frequency of the object light beam, means for scanning in a raster type manner the reference beam over said photodetection means so as to generate in response thereto a signal which is modulated in phase and amplitude in accordance with the interference pattern produced by the interfering light beams impinging on the photodetection means, means for generating horizontal and vertical synchronization pulses, means for transmitting the aforementioned modulated signal and said synchronization pulses to a remote receiver, video display means at said remote receiver, means producing a raster scan of an electron beam over the surface of said video display means means for modulating the scanned electron beam in accordance with the received modulated signal to temporarily store on said video display means a video image corresponding to the aforementioned interference pattern, a second source of corresponding coherent light at said remote receiver, and means for momentarily energizing said second source after the completion of a complete raster scan of said electron beam over the surface of said video display means, the light from said second source being directed toward and illuminating said complete raster whereby an instantaneous image of the original object scene is obtained at the receiver.

5. A system in accordance with claim 4 wherein a second photodetection means is positioned adjacent to, yet insulated from the first-mentioned photodetection means, said reference beam also scanning over said second photodetection means, the scanning of said reference beam with respect to said second photodetection means serving to generate horizontal and vertical synchronization pulses which are interspersed in said modulated signal.

6. A system in accordance with claim 5 wherein the first-mentioned photodetection means comprises a photomultiplier plate, and said second photodetection means comprises an L-shaped section disposed so as to be traversed at the beginning of each horizontal scan of the scanned reference beam to thereby generate the requisite horizontal synchronization pulses at the beginning of each horizontal scan, with the other leg of said L-shaped section disposed so as to be longitudinally traversed by the last horizontal scan of a complete raster scan to thereby generate the requisite vertical synchronization pulses.

7. A system in accordance with claim 6 wherein the horizontal and vertical synchronization pulses are inverted in polarity with respect to said aforementioned modulated signal prior to the transmission of the same to a remote receiver.